United States Patent
Appleton et al.

[11] 3,835,663
[45] Sept. 17, 1974

[54] SUPERCONDUCTING DYNAMO-ELECTRIC MACHINES

[75] Inventors: Anthony Derek Appleton; Frank Tinlin, both of Newcastle Upon Tyne, England

[73] Assignee: International Research & Development Company Limited, Tyne, England

[22] Filed: Apr. 27, 1973

[21] Appl. No.: 354,985

[30] Foreign Application Priority Data
May 1, 1972  Great Britain.................. 20189/72

[52] U.S. Cl................................. 62/505, 310/52
[51] Int. Cl................................. F25b 31/00
[58] Field of Search........... 310/52, 54, 10, 40, 178, 310/64; 62/3, 505

[56] References Cited
UNITED STATES PATENTS

| | | | |
|---|---|---|---|
| 2,975,308 | 3/1961 | Kilbourne | 310/54 |
| 3,015,960 | 1/1962 | Steele | 310/52 |
| 3,443,134 | 5/1969 | Dowsett | 310/178 |
| 3,521,091 | 7/1970 | Halas | 310/10 |
| 3,609,418 | 9/1971 | Halas | 310/10 |
| 3,626,717 | 12/1971 | Lorch | 62/505 |
| 3,638,440 | 2/1972 | Lawless | 62/3 |

FOREIGN PATENTS OR APPLICATIONS
1,215,979  12/1970  Great Britain...................... 310/52

*Primary Examiner*—R. Skudy
*Attorney, Agent, or Firm*—Kemon, Palmer & Estabrook

[57] ABSTRACT

A homopolar dynamo-electric machine having a stationary superconducting field winding contained in a cryostat through which liquid helium is circulated by a main cooling circuit is provided with an auxiliary cooling circuit to allow the winding to operate at partial load in the event of failure of the main cooling circuit or of the vacuum insulation of the cryostat.

2 Claims, 1 Drawing Figure

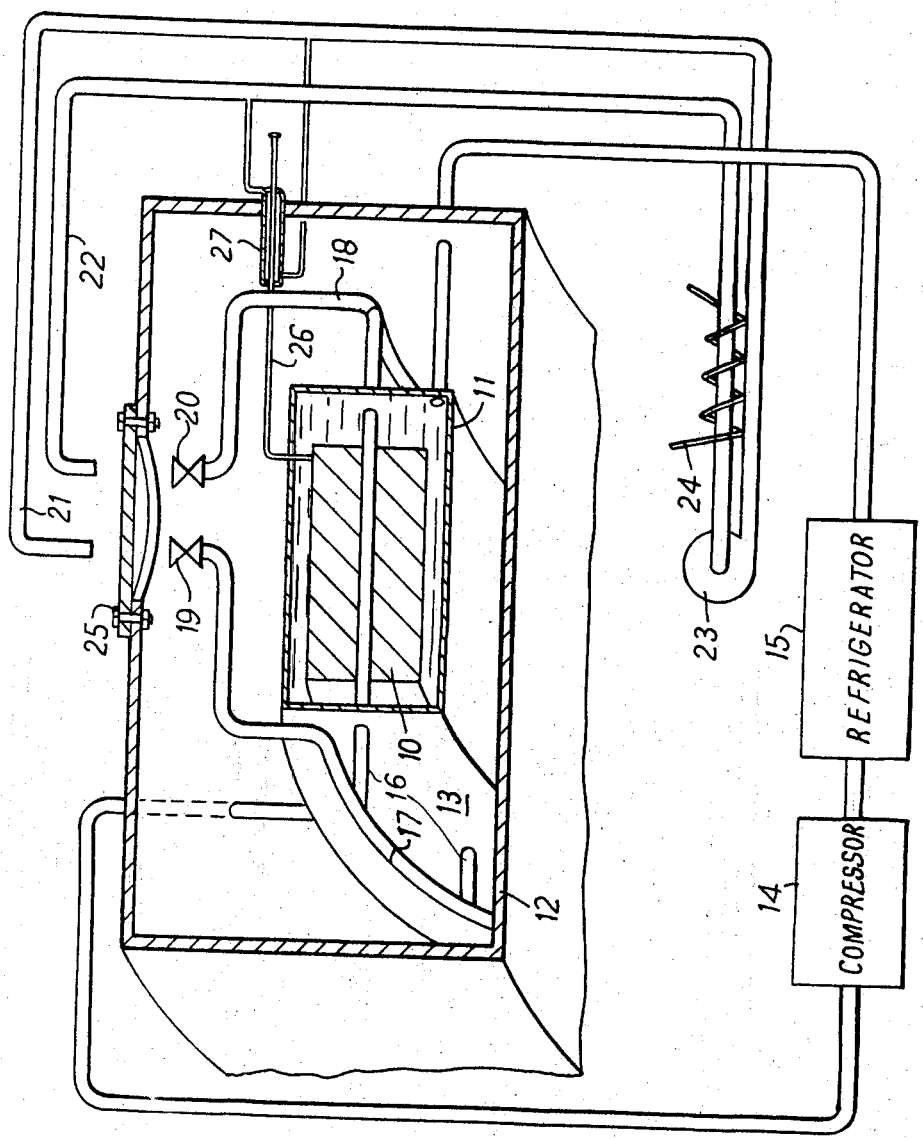

SUPERCONDUCTING DYNAMO-ELECTRIC MACHINES

This invention relates to dynamo-electric machines having superconducting windings and especially to homopolar machines.

British Pat. No. 1,133,724 describes a homopolar dynamo-electric machine having a rotor, and a stator, the stator including a field winding consisting of fixed coils of superconducting wire which are surrounded by a cryostat to maintain the winding at the low temperature necessary for it to be superconducting. Details of one possible construction of the cryostat are described in British Pat. No. 1,215,979.

Failure of the vacuum insulation of the cryostat or of the main cooling system which includes a refrigerator and compressor to supply liquid helium to the winding as a constant can lead to an emergency situation in which superconducting temperatures are no longer maintained, and the winding, which is now normally conductive, becomes overheated. It is an object of the present invention to provide for operation of the machine at a reduced rate while such emergency conditions are present.

Accordingly the present invention provides an independent auxiliary cooling system for the field windings which is preferably brought into operation in the event of failure of the main cooling system in order to allow part-load operation of the machine.

In a preferred construction the auxiliary cooling system consists of auxiliary coolant pipes or channels extending axially through the winding between the axially-extending coolant pipes or channels of the main coolant system. The auxiliary pipes or channels are connected between header pipes which can be connected to auxiliary coolant source. The header pipes preferably terminate in valved connections located within the heat-insulating vacuum space of the cryostat surrounding the winding. A removable access plate or cover is provided in the outer vessel of the cryostat to allow pipes from the auxiliary coolant course to be attached to the valved connections after the vacuum has been released.

The invention will now be described in more detail with the aid of an example illustrated in the accompanying drawing, in which the single FIGURE is a partial section of the stator of a homopolar dynamo-electric machine showing diagrammatically the associated cooling circuits.

In the drawing a cross-section of an annular stator winding and cryostat in a radial plane shows diagrammatically a superconducting winding 10 which is enclosed by an inner containment vessel 11 and an outer cryostat vessel 12, the annular space 13 between the vessels 11 and 12 being evacuated. The inner vessel 11 is filled with liquid helium and is connected to a compressor 14 and refrigerator plant 15 to form a primary cooling circuit for maintaining the winding 10 at superconducting temperatures.

The form of the winding 10, the vessels 11 and 12, and the primary cooling circuit may be as described in our British Patent No. 1,215,979. In particular the superconducting coils of the winding 10 are constructed as described in the aforesaid Patent with cooling pipes or channels extending axially through the winding to carry the liquid helium coolant through the winding. Between these main coolant pipes (not shown) there are auxiliary coolant ducts 16 which extend between header pipes 17 and 18 disposed at opposite ends of the winding. The pipes 16 pass axially through the winding 10 and extend through the walls of the vessel 11 into the vacuum space 13. The header pipes 17 and 18 are mounted in the vacuum space 13. The ends of the header pipes 17 and 18 carry valves 19 and 20, respectively, through which they can be connected to flexible water hoses 21 and 22, respectively, of an auxiliary cooling circuit comprising a water pump 23 and a heat exchanger 24. In normal operation the auxiliary cooling circuit is disconnected from the headers 17 and 18 and the outer vessel 12 of the cryostat is sealed by a removable cover 25.

The winding 10 has terminal leads 26 which pass out of the outer vessel 12 through a water jacket 27 which can be supplied with cooling water from the conduits 21 and 22 of the auxiliary cooling circuit. In normal operation the leads 26 are cooled internally by liquid helium from the main cooling circuit.

When the machine is in normal operation with the cryostat vessel 12 sealed and the winding 10 maintained at superconducting temperature by the main coolant circuit, the valves 19 and 20 are open so that the header pipes 17 and 18 and the auxiliary coolant pipes 16 are evacuated. The pipes 16 and the headers 17 and 18 are maintained at the same temperature as the winding 10, that is about 4°K., and there is no thermal path from the winding to the outer vessel 12 by way of the auxiliary cooling circuit.

In the event of failure of the vacuum in the space 13 or of failure of the main coolant circuit, the pressure in the space 13 is allowed to rise to atmospheric pressure and the cover 25 is removed so that the flexible water hoses 21 and 22 can be connected to the headers 17 and 18 to circulate cooling water through the auxiliary cooling ducts 16. In this way, the winding, although no longer at a temperature at which is is superconducting, is cooled to an extent sufficient to allow, say 10 percent of the maximum normal field current to be passed through it until the fault has been corrected and normal operation can be restored. The auxiliary cooling system is entirely independent of the main cooling circuit, thus allowing the main cooling circuit to be brought back into operation as soon as the fault has been corrected and the vacuum in the space 13 has been restored.

In an alternative construction, not illustrated in the drawing, the header pipes 17 and 18 are permanently connected by pipes of heat-insulating material to valves 19 and 20, which are mounted outside the cryostat vessel 12. The flexible hoses 21 and 22 can then be connected permanently to the valves 19 and 20 and the auxiliary cooling system is brought into operation simply by opening the valves 19 and 20. This arrangement involves a small additional leakage of heat into the winding during normal operation but in the event of failure of the main coolant circuit, the auxiliary cooling circuit can be brought into operation immediately and without breaking the heat-insulating vacuum in the space 13.

In place of axial cooling channels in the winding 10, the winding may be constructed with hollow radial spacers which serve to carry the cooling water between the headers 17 and 18.

Whilst in the embodiment described, the coolant in the auxiliary cooling circuit is water, other coolants may be used, such as liquefied natural gas.

In the embodiment described the auxiliary cooling circuit is brought into operation manually. An automatic control system can be included which by the use of temperature sensing devices and relays brings the auxiliary cooling circuit into operation whenever a fault occurs and the winding temperature rises above a predetermined level.

We claim:

1. In a dynamo-electric machine having a rotor, a stator, a cryostat containment vessel mounted on said stator, a field winding of superconductive material enclosed in said vessel, and a cooling system for maintaining said field winding at superconducting temperature by the circulation of cryogenic fluid, the improvement comprising an auxiliary coolant system including coolant ducts associated with said winding and headers connected to said ducts, and means for establishing a fluid connection to said headers for circulating an auxiliary coolant through said headers and ducts in the event of failure of the main cooling system.

2. In a dynamo-electric machine as claimed in claim 1 wherein said cryostat containment vessel is enclosed within an outer vessel and the space between said vessels is evacuated, said headers terminating in said evacuated space and said outer vessel having a removable cover whereby connecting pipes of an auxiliary coolant circuit may be attached to the headers after release of the vacuum in said space.

* * * * *